(12) United States Patent
Jung-Sassmannshausen et al.

(10) Patent No.: US 10,717,609 B2
(45) Date of Patent: Jul. 21, 2020

(54) CONVEYING DEVICE

(71) Applicant: Weber Machinenbau GmbH Breidenbach, Breidenbach (DE)

(72) Inventors: Fabian Jung-Sassmannshausen, Bad Endbach (DE); Christoph Kuhmichel, Bad Laasphe (DE)

(73) Assignee: Weber Maschinenbau Breidenbach GmbH (DE)

( * ) Notice: Subject to any disclaimer, the term of this patent is extended or adjusted under 35 U.S.C. 154(b) by 0 days.

(21) Appl. No.: 16/161,831

(22) Filed: Oct. 16, 2018

(65) Prior Publication Data
US 2019/0127154 A1 May 2, 2019

(30) Foreign Application Priority Data
Oct. 26, 2017 (DE) .................... 10 2017 125 110

(51) Int. Cl.
| B65G 47/64 | (2006.01) |
| B65G 21/14 | (2006.01) |
| B65G 21/06 | (2006.01) |
| B65G 21/10 | (2006.01) |
| B65G 15/30 | (2006.01) |
| B65G 41/00 | (2006.01) |

(52) U.S. Cl.
CPC .......... *B65G 47/646* (2013.01); *B65G 15/30* (2013.01); *B65G 21/06* (2013.01); *B65G 21/10* (2013.01); *B65G 21/14* (2013.01); *B65G 41/003* (2013.01); *B65G 2201/0202* (2013.01); *B65G 2207/26* (2013.01)

(58) Field of Classification Search
CPC ........ B65G 21/02; B65G 21/04; B65G 21/06; B65G 21/10; B65G 21/12; B65G 17/345; B65G 41/003; B65G 15/30; B65G 47/646

USPC ....................................................... 198/860.2
See application file for complete search history.

(56) References Cited

U.S. PATENT DOCUMENTS 5,304,745 A 4/1994 Rusk et al.
6,253,901 B1 * 7/2001 Hintz .................... B65G 17/345
198/370.06
(Continued)

FOREIGN PATENT DOCUMENTS

DE         10238482 A1    12/2003
DE    102006033651 A1     1/2008
(Continued)

OTHER PUBLICATIONS

German Search Report for German Application No. DE102017125110.3; dated Jun. 25, 2018; 2 pages.
(Continued)

*Primary Examiner* — Mark A Deuble
(74) *Attorney, Agent, or Firm* — Dickinson Wright PLLC

(57) ABSTRACT

The invention relates to a conveying device comprising a base, in particular a rack or a housing, supported on the ground; at least two longitudinal members which are carried by the base, which extend in a longitudinal direction and which are spaced apart from one another in a transverse direction; and a plurality of receivers which are arranged behind one another in the longitudinal direction, which are carried by the longitudinal members and at which conveyor belt sections are supported which are individually attachable and removable and which together form a conveying path extending in the longitudinal direction.

33 Claims, 5 Drawing Sheets

(56) References Cited

U.S. PATENT DOCUMENTS

Figure 1:
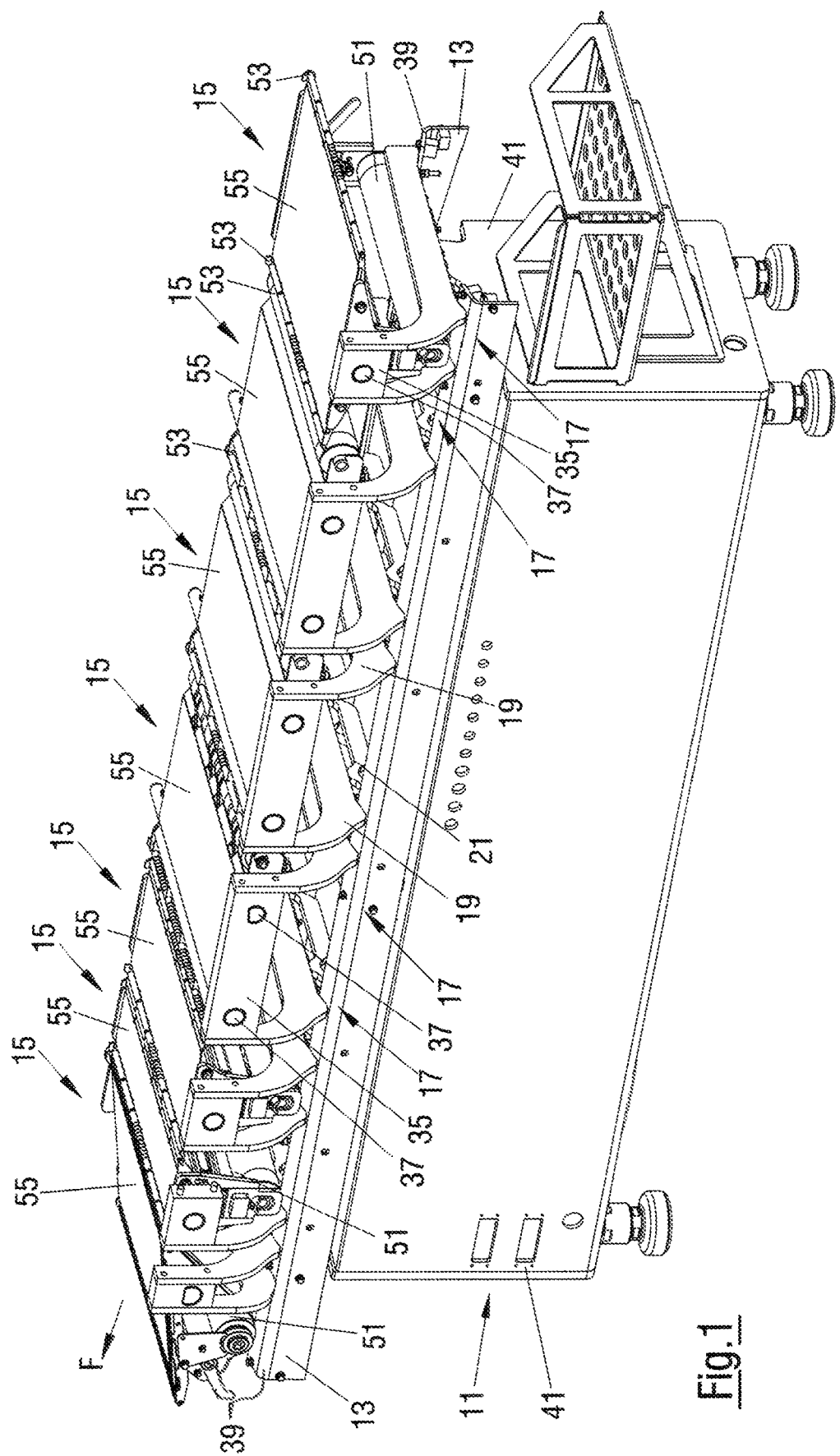

| | | | | |
|---|---|---|---|---|
| 7,307,225 | B2* | 12/2007 | Berger | B65G 15/62 |
| | | | | 177/119 |
| 8,196,737 | B2* | 6/2012 | Brayman | B65G 21/06 |
| | | | | 198/461.1 |
| 9,233,803 | B2* | 1/2016 | Pilarz | B65G 47/53 |
| 9,522,414 | B2* | 12/2016 | Yamakawa | G01G 19/03 |
| 2005/0167241 | A1* | 8/2005 | Hishinuma | B65G 17/345 |
| | | | | 198/370.06 |
| 2007/0187211 | A1* | 8/2007 | Vertogen | B65G 15/50 |
| | | | | 198/461.1 |
| 2008/0073185 | A1* | 3/2008 | Brayman | B65G 15/00 |
| | | | | 198/860.2 |
| 2010/0089274 | A1* | 4/2010 | Austin | B65G 17/345 |
| | | | | 104/118 |
| 2010/0213032 | A1* | 8/2010 | Bugge | B65G 15/24 |
| | | | | 198/583 |
| 2010/0219050 | A1* | 9/2010 | Deyanov | B65G 15/105 |
| | | | | 198/842 |
| 2013/0220777 | A1* | 8/2013 | Mauger | B65G 21/10 |
| | | | | 198/817 |
| 2015/0274431 | A1 | 10/2015 | Schmeiser | |

FOREIGN PATENT DOCUMENTS

| | | |
|---|---|---|
| DE | 102013206510 A1 | 6/2014 |
| DE | 102013203457 A1 | 8/2014 |
| DE | 102014106740 A1 | 6/2015 |
| DE | 102015104055 A1 | 9/2016 |
| EP | 2923955 A2 | 9/2015 |
| FR | 2821833 A1 | 9/2002 |
| JP | H09297051 | 11/1997 |
| WO | 2005057144 A2 | 6/2005 |

OTHER PUBLICATIONS

Communication regarding related EP App. No. 18202141.0; dated Mar. 25, 2019.

* cited by examiner

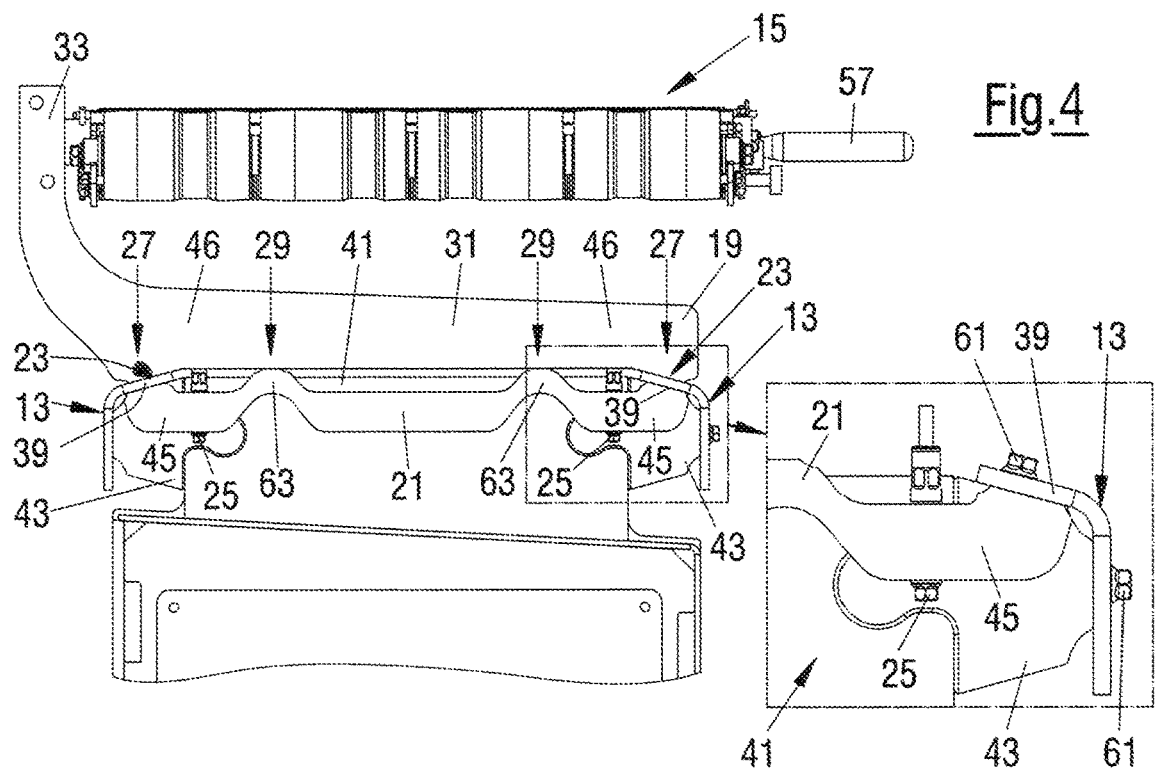
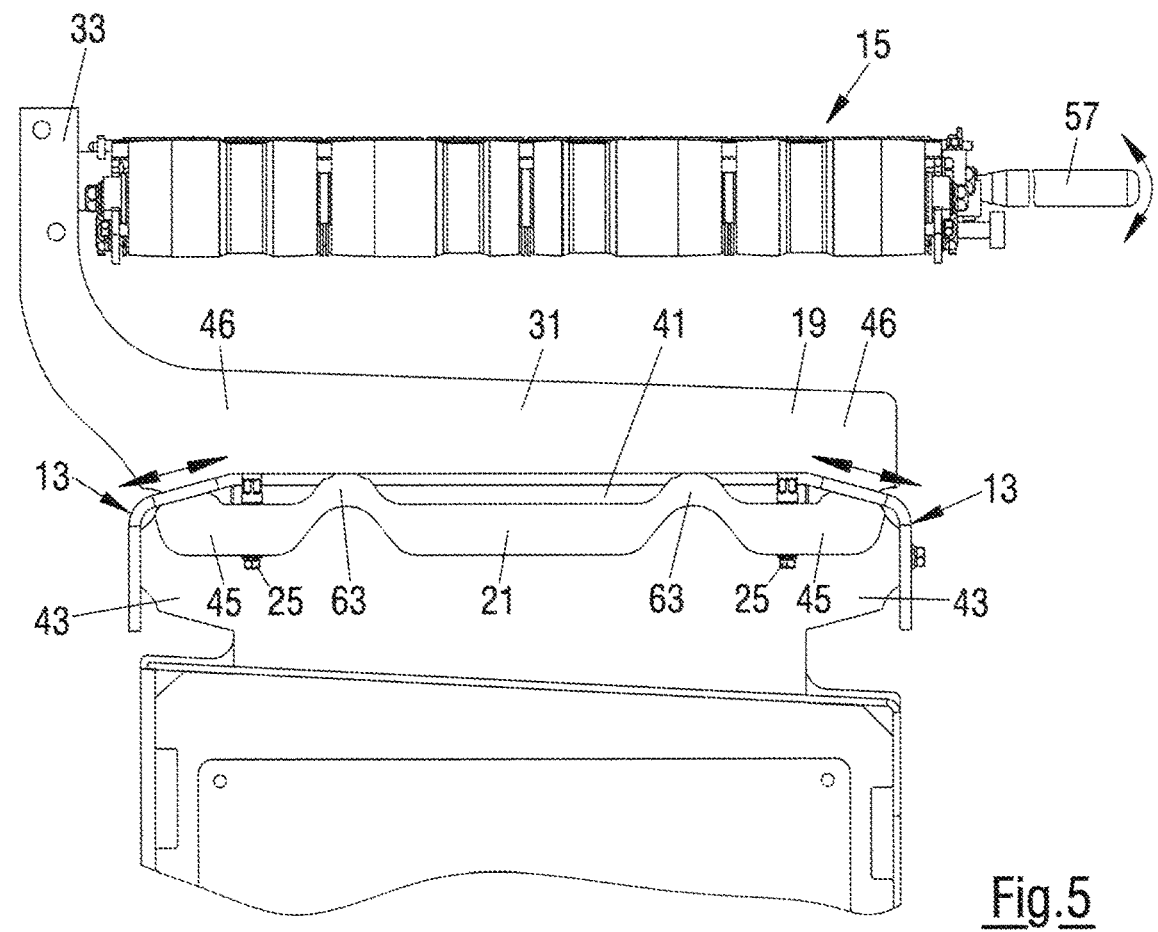

CONVEYING DEVICE

The invention relates to a conveying device comprising a base, in particular a rack or a housing, supported on the ground and a conveying path carried by the base and extending in a conveying direction also called the longitudinal direction in the following.

Such conveying devices are, for example, used in processing lines for food products. For example, there are one or more slicers at the start of such a line which cut food products such as sausage, meat or cheese into pieces or slices. A packaging machine at which the produced pieces or slices or portions comprising a respective plurality of slices are automatically packaged can be located at the line end.

In this respect, the conveying path between the slicers and the packaging machine not only serves purely for the transport of these products, but further tasks are to be satisfied along the conveying path in practice in dependence on the respective application.

They, for example, include a sorting of products and a temporary buffering of products. The latter in particular results from different working speeds of the slicer, on the one hand, and of the packaging machine, on the other hand, with respect to the number of products produced or packaged per time unit. A specific conveying path has to be provided for the buffering of products. Known buffer paths frequently comprise complex conveyor belt plants comprising conveyor belt paths arranged above one another in a plurality of planes.

Since packaging machines frequently work with formats, it is additionally necessary to compile the products produced by means of the slicers into matching format sets, i.e. into regular arrangements or arrays comprising a plurality of product rows and product columns, on the transport path.

A further function to be performed along the transport path in practice frequently comprises forming total portions from part portions by placing part portions above one another such that the part portions completely or partly overlap. Overlap devices which can satisfy such a function during the transport of the products are generally known and can be integrated into the respective transport path.

Special importance also accrues to the connection or coupling of the conveying path to the packaging machine or to handling apparatus, such as in particular robot units, which are present there and by which the supplied products can be transferred to the packaging machine. Independently of whether packaging is carried out with or without the use of robots, the conveying device forming the end of the transport path in any case has to provide the products in such a manner that the packaging machine can work efficiently.

The above statements make it clear that a variety of demands are made on the conveying path in particular in a processing line for food products. The operators of such systems therefore require different special devices which additionally frequently have a complex and huge design and are consequently inflexible in their handling and are also complex and/or expensive to clean.

The generally typical design of known conveying devices comprises a huge support and drive housing at the one side, the left or right side in the conveying direction, with conveyor belts or drive shafts for the conveyor belts projecting from said support and drive housing to the other side—the operating side. Such a laterally projecting conveying path can indeed, for example, project over a packaging machine disposed beneath it, but overall results in a very huge total design which takes up a lot of space.

A possibility, for example, known from DE 102 384 82 A1 of pivoting the total drive housing together with the conveying path about a longitudinal axis indeed allows the user to obtain access to a device arranged beneath the conveying path, but it does not change the large total design in any way.

DE 10 2014 106 740 A1 shows a similar design, but with the possibility of decoupling the conveyor belts from the drive housing. The conveyor belts can indeed be pivoted without the drive housing here. The disadvantage of the drive housing which is huge due to the accommodation of the drive technology remains, however.

A higher degree of flexibility is achieved in a concept with removable belt units known from DE 10 2013 206 510 A1. The cleaning, servicing and adaptation of the conveying path to different applications are hereby facilitated. However, the belt drives here remain at the lower rack when the units are removed, which requires measures for coupling and decoupling between the units and the drives. In addition, this division into the conveyor belt, on the one hand, and the belt drive, on the other hand, reduces the possibilities of a flexible design of the conveying path.

A combination of the above-mentioned unit concept and an overlap function for the overlapping of food products during transport is known from DE 10 2015 104 055 A1.

It is the object of the invention to provide a conveying device of the initially named kind which is variably usable and easily adaptable to different applications in a design which is as simple as possible and which can easily be cleaned in particular under hygienic aspects.

This object is satisfied by the features of claim 1.

In accordance with the invention, the conveying device comprises at least two longitudinal members which are carried by the base, which extend in a longitudinal direction and which are spaced apart from one another in a transverse direction; and a plurality of receivers which are arranged behind one another in the longitudinal direction, which are carried by the longitudinal members and at which conveyor belt sections are supported which are individually attachable and removable and which together form the conveying path extending in the longitudinal direction.

The invention consequently means a moving away not only from the typical, fixedly installed conveyor belt systems, but also from the previously known unit concepts in which the positions and conveying lengths of the individual conveyor belt units are fixedly predefined. For, in accordance with the invention, a possibility is provided by the longitudinal members extending in the conveying direction to variably assemble conveyor belt sections of different functionalities in any desired number and in different lengths and to fix them at different positions along the longitudinal members.

In this respect, the modular concept of the conveying device in accordance with the invention is particularly advantageous. The conveying path can be assembled individually in dependence on the respective application from a plurality of conveyor modules which are each provided in the form of an individually attachable and removable conveyor belt section. The receivers for the conveyor belt sections can also be provided as carrier modules which are individually attachable to the longitudinal members and whose lengths can be adapted to the conveyor belt sections.

A relatively large number of identical parts can advantageously be used for the design of the longitudinal members, of the receivers and of the conveyor belt sections themselves, such as can in particular be seen from the further developments of the invention explained in more detail in the following.

Provision is made in accordance with an advantageous further development that an interface for the attachment of the conveyor belt sections to the receivers is configured in the same manner at all the conveyor belt sections and receivers. Each conveyor belt section is hereby in principle compatible with each receiver, wherein at most an adaptation of the length may be necessary. The latter can be implemented in a simple manner by a modular design of the receivers.

Preferred embodiments result from the following statements and can also be seen from the claims and the Figures.

The receivers can each comprise at least two transverse members which are spaced apart in the longitudinal direction and which bridge the spacing between the longitudinal members in the transverse direction. The transverse members form a stable substructure for the arrangement of the respective conveyor belt section at the longitudinal members.

Receivers of different lengths can have transverse members of the same construction and only need to be adapted to the length of the respective conveyor belt section by selecting suitably dimensioned spacer elements. Only a single configuration of the transverse member in particular needs to be provided for a working width, i.e. for a predefined spacing of the longitudinal members in the transverse direction; in other words, the transverse members of all the receivers can be of the same construction. This can also be provided for components of the receivers which will be explained in more detail in the following and which serve as the interface for the attachment of the conveyor belt sections, e.g. for holding mandrels which are attached to spacer elements between transverse members and onto which the conveyor belt sections are plugged.

The number of different components for the receivers can be reduced to a minimum by such a modular design.

Overall, a bearing structure for the conveyor belt sections or their conveyor belt units is provided by the longitudinal members and by the transverse members and can generally be attached to racks and housings of any desired design, and indeed not only to a base provided specifically for the conveying path, but also to a base of another device of the respective line, e.g. to the rack or housing of a packaging machine, to the rack of a slicer in the portioning region or to the rack of a robot, in particular in the inlet region of a so-called picker robot or picker. The bearing structure in accordance with the invention is consequently particularly easily suitable for the integration of different devices in a functional unit, e.g. for the integration of a conveying device into a packaging machine. This also applies to embodiments with receivers which do not comprise any transverse members.

The transverse members are preferably each releasably fixed to the longitudinal members. The releasable attachment enables a change in the position of the respective receiver along the longitudinal members in a simple manner. Such a change can, for example, take place if—depending on the application—the length of the conveying path should be changed and conveyor belt sections of different lengths should thus be used or if one or more conveyor belt sections should be removed or pivoted outwardly and the gap thereby produced has to be filled by other conveyor belt sections in a different order.

The transverse members are preferably each configured in the region of the longitudinal members as releasable clamps for a fixing to the longitudinal members. A clamping connection can be established and released again particularly quickly and simply.

In a preferred embodiment, the transverse members each comprise an upper part and a lower part associated with the upper part, said upper part and lower part forming a respective clamp in the region of the longitudinal members for a fixing to a respective longitudinal member. The upper part and the lower part are preferably separate components. The upper part and the lower part can generally, however, also be permanently connected to one another and can e.g. be formed in one piece with one another. A connection between the upper part and the lower part, for example in the transverse direction approximately at the center between two longitudinal members, can enable a relative movability of lateral clamping sections in a corresponding configuration such that an upper part and a lower part can also be fixedly clamped to the longitudinal members when the upper part and the lower part are fixedly connected to one another or even formed in one piece with one another at a suitable point.

The transverse members are preferably adjustable along the longitudinal members, wherein an at least regionally continuous adjustability is in particular provided. The receivers and consequently the respective conveyor belt sections can hereby be positioned particularly flexibly in the longitudinal direction.

Fine increments between the receivers or their transverse members, on the one hand, and the longitudinal members, on the other hand, can also be provided instead of a continuous adjustability in the longitudinal direction. For example, a plurality of connection points or coupling points can be provided which are arranged distributed in the longitudinal direction and at which the transverse members can be fixed to the longitudinal members. The longitudinal members can e.g. each have a hole row which extends in the longitudinal direction and into which the receivers or their transverse members can be plugged using connection pins. A sufficiently precise fine setting of the longitudinal position of the transverse members or of the receivers can be made possible by a correspondingly fine pattern of connection points or coupling points.

In a further preferred embodiment, the transverse members are transversely adjustable relative to the longitudinal members in a plane extending perpendicular to the longitudinal direction. This adjustability is in particular possible in a continuous manner. Such an adjustability as is described above with respect to the adjustability of the transverse members in the longitudinal direction can also be provided instead of a continuous adjustability. A transverse adjustability of the transverse members enables an alignment of the conveyor belt section relative to the rack and an alignment of the conveyor belt sections with one another. The belt transitions between directly consecutive conveyor belt sections can hereby in particular be set in an exact manner.

Support surfaces of the longitudinal members which each cooperate with the transverse members are preferably inclined toward the horizontal. Provision is in particular made that these support surfaces each slope down outwardly to the side. It can hereby be achieved that the orientation of the conveyor belt section changes with respect to the horizontal on an adjustment of the transverse member in the transverse direction. The conveyor belt can therefore either be positioned horizontally or slightly inclined. This opens up an additional setting possibility and thus an additional possibility of the relative alignment between the conveyor belt sections. This embodiment in particular facilitates the alignability of the conveyor belt sections at conveying devices connected upstream or downstream, in particular with respect to an optimization of the respective transitions between the belt sections.

Provision is preferably made that clamps which are each formed by the transverse members comprise a respective bracing device. The clamps are preferably each formed by an upper part and by a lower part of the respective transverse member associated with the upper part, said upper part and lower part being able to be braced toward one another by means of a bracing device in order to clamp the respective longitudinal member.

The bracing device can comprise at least one tensioning screw. The tensioning screw is in particular active between an upper part and a lower part of the respective transverse member associated with the upper part.

The clamping between the transverse members and the longitudinal members can be designed particularly effectively in each case if, in accordance with a further development of the invention, clamps which are each formed by an upper part and by a lower part of the transverse members associated with the upper part each comprise a clamping point at which a longitudinal member can be clamped between the upper part and the lower part and a support point which is spaced apart from the clamping point in the transverse direction and at which the upper part and the lower part can be supported at one another. A respective bracing device by which the upper part and the lower part can be braced toward another is active between the clamping point and the support point in this respect.

In accordance with a preferred embodiment of the invention, the receivers for the conveyor belt sections are asymmetrical and each comprise a carrier side for force transfer into the longitudinal members and an access side via which the respective conveyor belt section is laterally attachable or removable. The conveyor belt sections consequently do not have to be inserted from above or removed upwardly. A simpler lateral handling is rather possible by this further development of the invention. This is also particularly advantageous for an assembly and a dismantling of the belts or belt straps of the conveyor belt sections, for example for cleaning purposes, since the belts or belt straps can then easily be laterally removed and attached again without the total conveyor belt section respectively having to be removed.

This asymmetry additionally has the advantage that the access side can simply selectively be disposed at the left side or the right side of the conveying device by an assembly rotated by 180° of the receivers at the longitudinal members or of the total arrangement comprising longitudinal members and receivers on the base.

The transverse members or upper parts of the transverse members can in particular each comprise a support section extending in the transverse direction for support at the longitudinal members and a carrier section extending upwardly from the support section. The carrier section is preferably arranged in the region of an end of the support section.

In a possible embodiment, the transverse members or upper parts of the transverse members are each L-shaped viewed in the longitudinal direction.

Provision is furthermore made in an embodiment that the conveyor belt sections are each borne by a spacer element which extends between the transverse members in the longitudinal direction and which is connected to the transverse members.

The spacer element can be connected to carrier sections of the transverse members or to carrier sections of upper parts of the transverse members which each extend upwardly from a support section of the respective transverse member or upper part.

In particular when an asymmetrical design of the receivers is provided, such as is described above, a structure which is fork-like overall can be provided by this arrangement comprising transverse members and a spacer element, in which structure the spacer element is located laterally, that is in the region of one of the longitudinal members, and is additionally attached higher with respect to the longitudinal member. If, in accordance with a preferred further development of the invention, the spacer element is configured to support the conveyor belt section, no construction space for the receiver carrying the conveyor belt section is required beneath the conveyor belt section.

Overall, an open bearing structure which is easy to clean and nevertheless stable can hereby be implemented for the respective conveyor belt section and, if necessary, allows access to the base from above at least when the conveyor belt section is removed.

Provision can furthermore be made that the receivers each comprise at least one holder which is held at one side and which freely projects toward the other side and via which a respective conveyor belt section is couplable to the receiver.

The holder is preferably attached to a spacer element between the transverse members. The conveyor belt section is preferably couplable to the receiver by a lateral pushing or plugging onto the holder. The holder can, for example, be configured as a mandrel or as a bar.

The transverse members or upper parts and lower parts of the transverse members respectively associated with the upper parts can each be manufactured from a flat material, in particular by a cutting out or a punching out, and can be fixed standing upright to the longitudinal members with their flat sides facing in the longitudinal direction.

The longitudinal members preferably each comprise a section element or a rail element having a cross-sectional shape which is at least substantially constant in the longitudinal direction.

The longitudinal members can have a cross-sectional profile which comprises a member which is at least substantially straight and to which the transverse members can be fixed, in particular fixedly clamped.

Such an embodiment of the longitudinal members makes it possible to displace the receivers in the non-fixed state in the manner of a slide in the longitudinal direction along the longitudinal members in order to set a respective longitudinal position of the receiver, and consequently of the respective conveyor belt section, in a simple manner in this way. If—as already initially mentioned—support surfaces of the longitudinal members cooperating with the transverse members do not both extend horizontally, but rather, for example, each slope down outwardly to the side in accordance with a preferred further development, the further advantage results from this that the transverse members cannot easily slide off on their own from the longitudinal members in the transverse direction in the not yet fixed state.

If a transverse adjustability is not necessary, a support of the transverse members at the longitudinal members which is secured in the transverse direction can also be implemented by a different configuration of the cooperating support surfaces, for example, by a form-fitted connection active in the transverse direction.

The longitudinal members are preferably fastened to a plurality of supports of the base which are spaced apart in the longitudinal direction, which extend at least approximately up to the level of the transverse members or of lower parts of the transverse members and which are arranged offset from the transverse members in the longitudinal direction.

Provision can be made in this respect that fastening sections of the supports serving for the fastening of the longitudinal members to the supports are covered from the outside by the longitudinal members. Such an arrangement not only results in an appealing outer appearance, but rather reduces contaminations of the inwardly disposed fastening regions between the supports and the longitudinal members due to external influences.

Provision can furthermore be made that all of the receivers are movable together between an operating position and a servicing and/or cleaning position by an adjustment of the longitudinal members relative to the base, in particular by a pivoting about a longitudinal axis, about a transverse axis and/or about a vertical axis. The fact can hereby be utilized that a stable bearing structure is overall present by way of the longitudinal members and receivers fixed thereto and can be moved as a whole relative to the rack. Access to that region of the base which is located beneath the conveying path when the conveying path is in the operating position can be obtained by pivoting this bearing structure.

The conveyor belt sections are preferably formed as a respective conveyor belt unit which is attachable to the receiver and removable from the receiver as a whole.

The conveyor belt sections, in particular the conveyor belt units, preferably each have an integrated belt drive. The integrated belt drive can, for example, comprise a tubular motor inserted into the respective drive shaft. With respect to the demanding working environments for the processing of food products, stainless steel motors are e.g. available for this purpose and are in particular protected against external influences, such as in particular heat and moisture, by a stainless steel encapsulation.

It is an advantage of the integrated belt drives that components, in particular electrotechnical components, required for their operation do not have to be arranged in a housing or a rack directly beneath the conveying path. It is merely necessary to connect the conveyor belt sections to supply and control lines. The corresponding supply and control units can be arranged remote from the conveying path.

The conveying path of the conveying device preferably extends in exactly one conveying plane.

The invention additionally relates to a conveying unit comprising at least two longitudinal members which extend in the longitudinal direction and which are spaced apart from one another in the transverse direction; and a plurality of receivers which are arranged behind one another in the longitudinal direction, which are carried by the longitudinal members and at which conveyor belt sections are supported which are individually attachable and removable and which together form a conveying path extending in the longitudinal direction.

A separate base can be associated with such a conveying unit. Alternatively, the conveying unit can be attached to the base of another device, e.g. of a packaging machine, to provide an integrated functional unit with a common base in this manner.

With the exception of the embodiments relating to the base, all of the further developments of the conveying device disclosed above can also be provided in the conveying unit which does not necessarily comprise a base.

Figure 2:
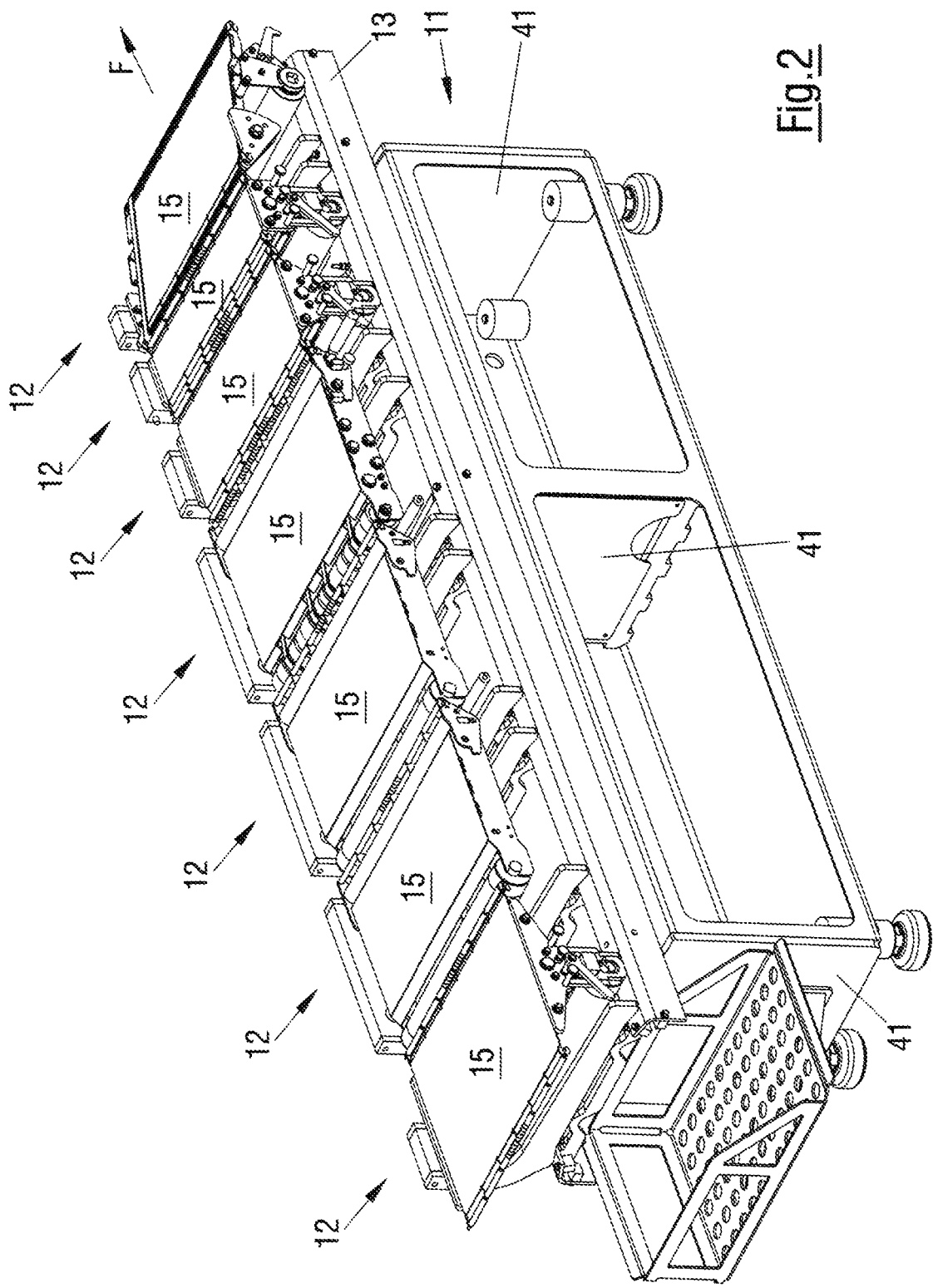
Figure 3:
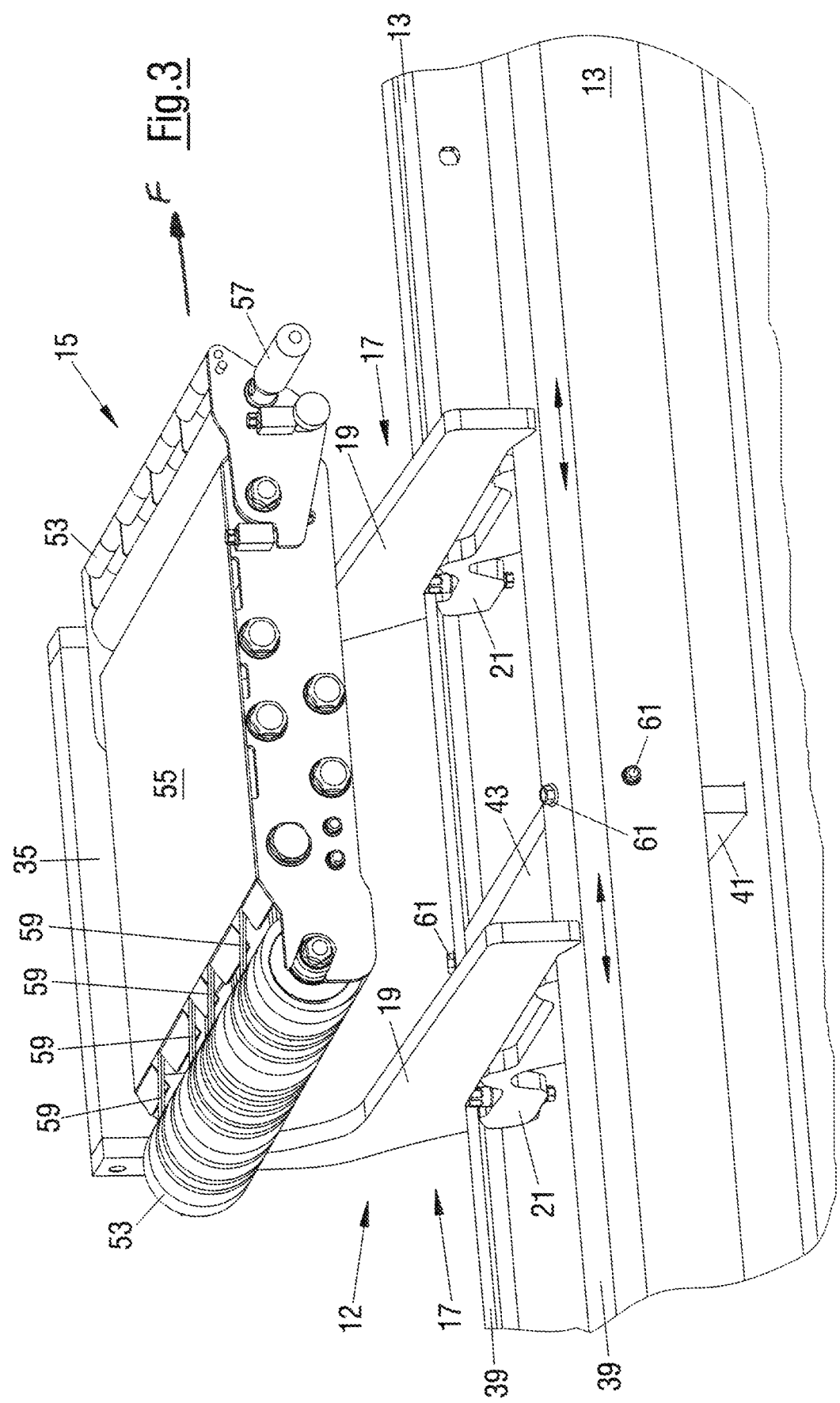
Figure 6:
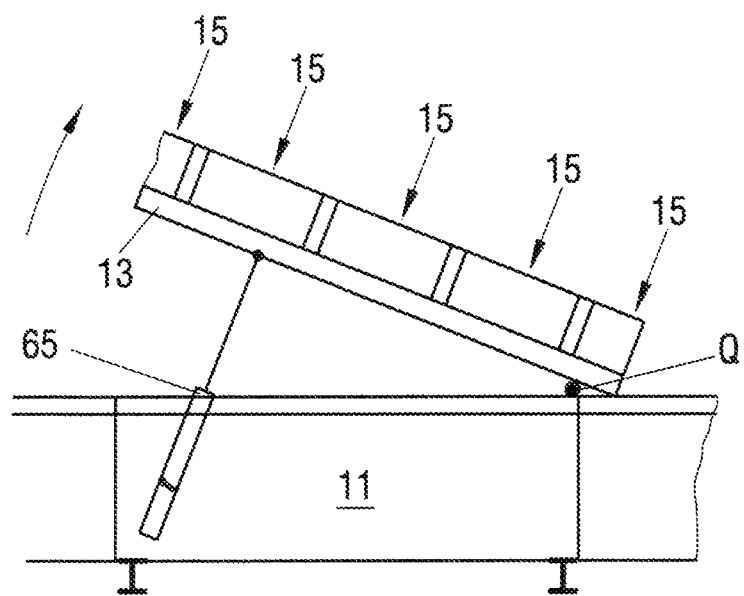
Figure 7:
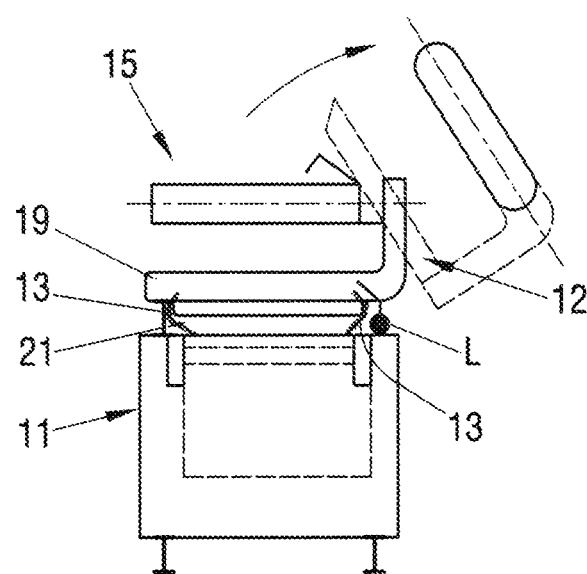
Figure 8:
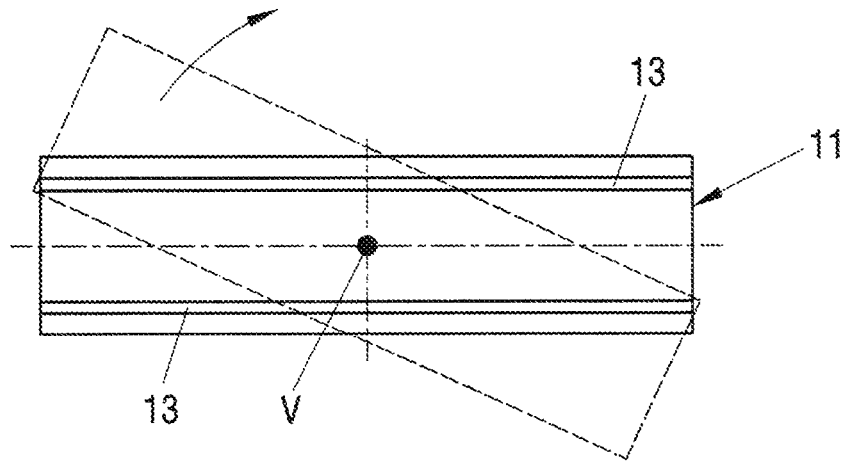

The invention will be described in the following by way of example with reference to the Figures. There are shown:

FIG. 1 a perspective view of a conveying device in accordance with the invention viewed from a longitudinal side;

FIG. 2 the conveying device of FIG. 1 in a perspective view viewed from the other longitudinal side;

FIG. 3 a receiver with the conveyor belt unit of the conveying device of FIG. 2 in an enlarged representation;

FIGS. 4 and 5 two possible embodiments of a receiver with a conveyor belt unit in a view in the conveying direction; and FIGS. 6 to 8 schematically in each case, different possibilities for pivoting the total conveying path relative to the base of a conveying device in accordance with the invention.

The conveying device in accordance with the invention shown perspectively as a whole in each case in FIGS. 1 and 2 comprises a base 11 supported on the ground in the form of a housing at whose upper side two longitudinal members 13 are arranged in the form of a bracket section, said longitudinal members being arranged in parallel at a spacing from one another and extending in a conveying direction F also called the longitudinal direction in the following.

The sections 13 are not carried directly by the box-shaped housing of the rack 11, but rather by supports 41, three supports in this embodiment, arranged at a spacing from one another in the longitudinal direction (cf. also FIGS. 3, 4 and 5). A respective fastening section 43 of the supports 41 extends up to the level of the longitudinal members 13 which are screwed from the outside onto these fastening sections 43 such that the fastening sections 43 are covered from the outside by the bracket sections 13.

The conveying path of the conveying device is formed by a plurality of conveyor belt units 15 which are arranged behind one another in the longitudinal direction and which are shown without the running around conveyor belts in all the Figures for a better illustration of the design.

A receiver 12 is associated with each unit 15. The receivers 12 each comprise two transverse members 17 in L shape which are of the same construction and between which a parallelepiped-shaped spacer element 35 is fastened at a side. Each receiver 12 hereby has a stable, fork-like structure which is downwardly open.

In FIGS. 1 and 2, a transverse member 17 is in each case not shown at the second receiver viewed in the conveying direction in order to better illustrate the arrangement of the conveyor belt unit 15 at the receiver 12.

It can be seen from FIGS. 1 and 2 that the individual conveyor sections 12, 15, that is the units each comprising a receiver 12 having two transverse members 17 and a spacer element 35 as well as a conveyor belt unit 15, can differ from one another both with respect to their functionality and to their length in the conveying direction.

Comparatively long conveying units are provided with correspondingly long spacer elements 35, with these comparatively long spacer elements 35 each having two holding mandrels 37 which are each fixedly connected to the respective spacer element 35 at their one end and freely project toward the other side.

The relatively shorter conveying units are provided with correspondingly shorter spacer elements 35 which each bear only one holding mandrel 37.

The conveyor belt units 15 are each plugged onto the holding mandrels 37 from the access side or operating side and are secured at the free ends of the holding mandrels 37 by suitable securing means such as screws or pins.

If—as with the relatively long conveying units—a plurality of holding mandrels 37 are provided, the orientation of the conveyor belt unit 15 relative to the spacer element 35 and consequently to the respective transverse members 17 is hereby fixed. The orientation of the conveyor belt units 15 and consequently of supporting surfaces 55, present at the upper side, for the conveyor belts, not shown here, relative to the rack 11 is consequently determined by the position of the transverse members 17 relative to the longitudinal members 13.

If the respective conveying unit comprises only one single holding mandrel 37, this holding mandrel 37 simultaneously serves as a pivot bearing for the respective conveyor belt unit 15 in order to be able to set the inclination of the conveying surface as respectively desired. A respective set inclination of the conveying surface can be fixed in that the conveyor belt unit 15 is fixed by suitable means to the holding mandrel 37 onto which it is plugged.

The conveyor belt units 15 are each provided with a separate integrated drive for the conveyor belts. In the comparatively long conveyor belt units 15, the belt drives can each be provided in the form of an electric motor which is configured as a tubular motor and which is integrated into one of the deflections for the conveyor belt formed by rolls or rollers.

This is not possible when the deflections for optimizing the belt transitions or for coupling the conveying device to conveying devices connected upstream or downstream have a comparatively small diameter such as, in the embodiment shown, is in particular, but not exclusively, the case for the comparatively short conveyor belt units comprising only one single holding mandrel 37. A receiver 12 which comprises only one single holding mandrel 37 and whose conveyor belt unit 15 nevertheless has a relatively long conveying path is provided at the conveying unit at the input side, that is at the right in FIG. 1.

In these conveying units, the drive motor 51 is either arranged centrally between the two transverse members 17 comparatively far below, namely directly above the two longitudinal members 13, or—as with the conveying unit at the output side, that is at the left in FIG. 1—is arranged outside the two transverse members 17, but in turn relatively far below directly above the two longitudinal members 13. Such an arrangement of the belt drive requires a different guide of the running around conveyor belt. For the conveyor belt here not only has to be guided via the end-side deflections which are disposed at the level of the conveying plane defined by the conveying surface of the conveyor belt, but additionally have to be guided via the drive motor 51 that is further down.

Having regard to the remaining conveying units, it can be seen from FIGS. 1 and 2 (and in particular also from FIG. 3) that the conveyor belt units 15 each have a deflection 53 at the input side which has a relatively large diameter such that—as mentioned—a tubular motor serving as a belt drive can be accommodated therein. At the output side, the conveyor belt units 15 are each provided with a deflection 53 which has a relatively small diameter and which can consequently form an optimized belt transition, having a minimal gap, with the adjoining deflection of the following conveyor belt unit 15 having a larger diameter.

FIG. 3 shows a conveying unit with two transverse members 17 and with a conveyor belt unit 15 which is plugged onto the holding mandrels, not shown, and which has a belt deflection 53 at the input side which has a relatively large diameter and a belt deflection 53 at the output side which has a relatively small diameter. The belt deflection 53 at the output side can be moved relative to a frame of the unit 15 by means of a lever 57 such that the conveyor belt not shown here can either be relaxed or tensioned. It is consequently not necessary to remove the unit 15 from the receiver 12 to replace or clean the conveyor belt. It is rather sufficient to release the belt tension and to remove the belt from the unit 15 to the side.

The conveyor belt unit 15 shown in FIG. 3 is configured with multiple tracks and comprises a plurality of conveying tracks which are driven individually and independently of one another. For this purpose, the conveyor belt unit 15 comprises a plurality of drive belts which wrap around the deflection 53 at the input side at points spaced apart in the transverse direction and which lead to a plurality of drive motors, not shown, which are arranged beneath the support 55 and which each drive the respective deflection 53 at the input side and thus the respective conveyor belt via the drive belts 59. This embodiment shows that it is not necessary to integrate the belt drive into the deflection 53 such as was explained above as an alternative possibility for an integration of the belt drive. Generally, provision can consequently be made in a multitrack variant of a conveyor belt section 15 that the individual drive motors which are each associated with a track are arranged beneath the support formed by the conveyor belts, i.e. are not e.g. configured as tubular motors such as is mentioned in another passage as an alternative embodiment.

As will be described in more detail in connection with FIGS. 4 and 5 in the following, the transverse members 17 are each configured in multiple parts. Each transverse member 17 comprises an L-shaped upper part 19 and a lower part 21. In the region of the longitudinal members 13, an upper part 19 and the associated lower part 21 form a respective clamp by which the upper member 39 of the bracket section forming the respective longitudinal member 13 is clamped in order to fix the transverse members 17 to the longitudinal members 13 in this manner.

FIG. 3 additionally shows a support 41 for carrying the longitudinal members 13 which is arranged in the region between the two transverse members 17 in the longitudinal direction. The longitudinal members 13 are fixed by means of fastening screws 61 to the fastening sections 43 of the supports 41 disposed at the level of the lower parts 21 of the transverse members 17.

FIGS. 4 and 5 in particular show the cross-sectional profile of the longitudinal members 13. The profile is approximately V-shaped with an opening angle of approximately 105° between the two members. The outer, lower member is vertically oriented such that the inner, upper member 39 is slightly inclined with respect to the horizontal and slopes down laterally from the inside to the outside.

The two longitudinal members 13 consequently provide, via their upper members 39, two planar slanted surfaces which are inclined in opposite senses to one another and relative to the horizontal. These slanted surfaces serve as support surfaces 23 for cooperating support surfaces at the lower side of a support section 31 of the L-shaped upper part 19 of the transverse member 17 extending substantially horizontally.

The respective conveying unit comprising the conveyor belt unit 15 and the transverse members 17 rests on these support surfaces 23 of the longitudinal members 13, said transverse members each comprising a lower part 21 in addition to the already mentioned L-shaped upper part 19.

The holding mandrels which are not shown here and onto which the conveyor belt unit 15 is plugged are attached to a carrier section 33 projecting upwardly from the support section 31 of the upper part 19.

Each upper part 19 and the associated lower part 21 together form a respective clamping point 27 in the region of the upper member 39 of the respective longitudinal member 13. A support point 29 arranged inwardly at a spacing in the transverse direction is associated with each clamping point 27 and is contacted by an elevated portion 63, formed at the lower part 21, at the lower side of the support section 31 of the upper part 19. The elevated portions 63 are each rounded at their side facing the upper part 19 such that the upper part 19 and the lower part 21 in each case only contact one another in a substantially linear form at the two support points 29.

A tensioning screw 25 is active in the transverse direction between each pair comprising a clamping point 27 and an associated support point 29; it is guided through the lower part 21 and is screwed to the upper part 19 to brace the upper part 19 and the lower part 21 toward one another. The respective clamping section 45 of the lower part 21 and the associated clamping section 46 of the upper part 19 are moved toward one another via the common abutment formed by the support point 29 by this bracing process. The two clamping sections 45, 46 hereby together form a clamp by means of which the transverse member 17 is fixedly clamped to the member 39 of the respective longitudinal member 13.

The detailed representation in FIG. 4 shows an enlarged section of the clamping region at the right in FIG. 4 without the upper part 19. The fastening screws 61 are disposed behind the plane defined by the lower part 21 and by the upper part 19 in the longitudinal direction, namely in the plane defined by the support 41, and serve to screw the longitudinal member 13 to the fastening section 43 of the support 41. Reference is also made to the above statements on FIG. 3 in this respect.

The embodiments of FIGS. 4 and 5 differ from one another in that the fastening section 43 is not formed in one piece with the support 41 in the embodiment of FIG. 4, but these two components are rather connected to one another by a form-fitted connection active in the plane of the support 41. An alternative embodiment is shown by FIG. 5 in which the fastening sections 43 are formed in one piece with the support 41.

FIGS. 6, 7 and 8 each schematically show different possibilities of moving the total conveying path comprising longitudinal members 13 and receivers 12 with attached conveyor belt units 15 as a whole relative to the rack 11.

In accordance with FIG. 6, the conveying path is pivotable about an axis Q extending in the transverse direction by means of a lifting device 65. FIG. 7 shows a variant in which the conveying path is pivotable about a longitudinal axis L which extends in the conveying direction and which extends in the region of the lower end of the lower member of the bracket section which forms the longitudinal member 13 at the right in FIG. 7. It can be recognized in the schematic plan view of FIG. 8 that the conveying path, of which only the longitudinal members 13 are shown, can be pivoted about a vertical axis V in this embodiment.

The position of the conveying path pivoted out of the operating position is in each case indicated by dashed lines in both FIG. 7 and FIG. 8.

An advantage of the conveying device in accordance with the invention is that it can be arranged in direct proximity of a packaging machine. Provision can in this respect be made that a rack of the packaging machine can form a longitudinal member and/or the transverse members of the conveying device. The packaging machine and the conveying device in accordance with the invention can hereby form an integrated unit.

For example, the base of the conveying device can be fixed directly to the rack of a packaging machine. It is furthermore possible to dispense with a base 11, such as it is shown in the Figures explained above, and to attach the two longitudinal members 13 directly to the rack of the packaging machine. Alternatively, the conveying device can have its own rack and can either be disposed next to the packaging machine or can engage over the packaging machine in the manner of a bridge.

It is furthermore possible in accordance with the invention to provide the conveying unit which is at the very front in the conveying direction directly in front of the packaging machine in the form of a feeding belt, i.e. a conveying device in accordance with the invention can take over the function of a so-called feeder.

Generally, the base carrying the longitudinal members can completely or partly be a separate base of the conveying device, but it can alternatively also, for example, form the rack or the housing of another component of a processing line including a packaging machine.

The invention consequently also relates to a conveying device comprising at least two longitudinal members and a plurality of receivers for supporting the conveyor belt sections, said receivers being carried by the longitudinal members, and it thus also relates to a conveying unit without a base supported on the ground. Such a conveying unit can—as explained above—be attached to the base of another device.

REFERENCE NUMERAL LIST

11 base
12 receiver
13 longitudinal member
15 conveyor belt section; conveyor belt unit
17 transverse member
19 upper part
21 lower part
23 support surface of the longitudinal member
25 bracing device, tensioning screw
27 clamping point
29 support point
31 support section
33 carrier section
35 spacer element
37 holder
39 member
41 support
43 fastening section
45 clamping section
46 clamping section
51 motor
53 deflection
55 supporting surface
57 handle
59 drive belt
61 fastening screw
63 elevated portion
65 lifting device
F conveying direction
L longitudinal axis
Q transverse axis
V vertical axis

The invention claimed is:

1. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections being individually attachable and removable and which together form a conveying path extending in the longitudinal direction, wherein the conveyor belt sections are formed as a respective conveyor belt unit which is attachable to the receiver and removable from the receiver as a whole, and/or wherein the conveyor belt sections each have an integrated belt drive.

2. A conveying device in accordance with claim 1, wherein transverse members of the receivers are each releasably fixed to the longitudinal members.

3. A conveying device in accordance with claim 1, wherein transverse members of the receivers are each configured in the region of the longitudinal members as releasable clamps for a fixing to the longitudinal members.

4. A conveying device in accordance with claim 1, a plurality of transverse members of the receivers, the plurality of transverse members adjustable along the longitudinal members.

5. A conveying device in accordance with claim 1, further comprising a plurality of support surfaces of the longitudinal members, wherein the plurality of support surfaces each cooperate with transverse members of the receivers and are inclined toward the horizontal.

6. A conveying device in accordance with claim 1, further comprising a plurality of clamps which are each formed by transverse members of the receivers and which comprise a respective bracing device.

7. A conveying device in accordance with claim 6, wherein the bracing device comprises at least one tensioning screw.

8. A conveying device in accordance with claim 7, wherein the at least one tensioning screw which is active between an upper part and a lower part of the respective transverse member associated with the upper part.

9. A conveying device in accordance with claim 1, further comprising a plurality of clamps which are each formed by transverse members of the receivers and which are each formed by an upper part and by a lower part of the respective transverse member associated with the upper part, said upper part and lower part being able to be braced toward one another by means of a bracing device in order to clamp the respective longitudinal member.

10. A conveying device in accordance with claim 1, wherein clamps which are each formed by an upper part and by a lower part of transverse members of the receiver associated with the upper part each comprise a clamping point at which the longitudinal member can be clamped between the upper part and the lower part and a support point which is spaced apart from the clamping point in the transverse direction and at which the upper part and the lower part can be supported at one another; and wherein a bracing device by which the upper part and the lower part can be braced toward another is active between the clamping point and the support point.

11. A conveying device in accordance with claim 1, further comprising a plurality of transverse members of the receivers or a plurality of upper parts of the transverse members, each of the plurality of transverse members or of the plurality of upper parts being L-shaped viewed in the longitudinal direction.

12. A conveying device in accordance with claim 1, wherein the conveyor belt sections are each borne by a spacer element which extends between transverse members of the receiver in the longitudinal direction and which is connected to the transverse members.

13. A conveying device in accordance with claim 12, wherein the spacer element is connected to carrier sections of the transverse members or to carrier sections of upper parts of the transverse members which each extend upwardly from a support section of the respective transverse member or upper part.

14. A conveying device in accordance with claim 1, further comprising a plurality of transverse members of the receivers or a plurality of upper parts and lower parts of the transverse members respectively associated with the upper parts each of the plurality of transverse members or of the plurality of upper parts and lower parts being manufactured from a flat material and are fixed standing upright to the longitudinal members with their flat sides facing in the longitudinal direction.

15. A conveying device in accordance with claim 1, wherein the longitudinal members each comprise a section element or a rail element having a cross-sectional shape which is at least substantially constant in the longitudinal direction.

16. A conveying device in accordance with claim 1, wherein the longitudinal members have a cross-sectional profile which comprises a member which is at least substantially straight and to which the transverse members can be fixed or fixedly clamped.

17. A conveying device in accordance with claim 1, wherein the longitudinal members are fastened to a plurality of supports of the base which are spaced apart in the longitudinal direction and which extend at least approximately up to the level of transverse members of the receivers or of lower parts of the transverse members and which are arranged offset from the transverse members in the longitudinal direction.

18. A conveying device in accordance with claim 1, wherein all of the receivers are movable together between an operating position and a servicing and/or cleaning position by an adjustment of the longitudinal members relative to the base.

19. A conveying device in accordance with claim 18, wherein the adjustment of the longitudinal members comprises a pivoting about at least one of a longitudinal axis, a transverse axis and a vertical axis.

20. A conveying device in accordance with claim 1, wherein the conveying path extends in exactly one conveying plane.

21. A conveying unit comprising:
at least two longitudinal members which extend in the longitudinal direction and which are spaced apart from one another in the transverse direction; and
a plurality of receivers which are arranged behind one another in the longitudinal direction, the plurality of receivers carried by the longitudinal members and at which conveyor belt sections are supported, the conveyor belt sections being individually attachable and removable and which together form a conveying path extending in the longitudinal direction, wherein the conveyor belt sections are formed as a respective conveyor belt unit which is attachable to the receiver and removable from the receiver as a whole, and/or wherein the conveyor belt sections each have an integrated belt drive.

22. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections individually attachable and removable and which together form a conveying path extending in the longitudinal direction,
wherein the receivers each comprise at least two transverse members which are spaced apart in the longitudinal direction and which bridge the spacing between the longitudinal members in the transverse direction.

23. A conveying device in accordance with claim 22, further comprising a plurality of clamps which are each formed by transverse members of the receivers and which comprise a respective bracing device.

24. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections individually attachable and removable and which together form a conveying path extending in the longitudinal direction,
a plurality of transverse members of the receivers, each of the plurality of transverse members comprising an upper part and a lower part associated with the upper part, said upper part and lower part forming a respective clamp in the region of the longitudinal members for a fixing to a respective longitudinal member.

25. A conveying device in accordance with claim 24, further comprising a plurality of clamps which are each formed by transverse members of the receivers and which comprise a respective bracing device.

26. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections individually attachable and removable and which together form a conveying path extending in the longitudinal direction,
a plurality of transverse members of the receivers, the plurality of transverse members transversely adjustable relative to the longitudinal members in a plane extending perpendicular to the longitudinal direction.

27. A conveying device in accordance with claim 26, further comprising a plurality of clamps which are each formed by transverse members of the receivers and which comprise a respective bracing device.

28. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections individually attachable and removable and which together form a conveying path extending in the longitudinal direction,
wherein the receivers for the conveyor belt sections are asymmetrical and each comprise a carrier side for force transfer into the longitudinal members and an access side via which the respective conveyor belt section is laterally attachable and removable.

29. A conveying device in accordance with claim 28, further comprising a plurality of clamps which are each formed by transverse members of the receivers and which comprise a respective bracing device.

30. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections individually attachable and removable and which together form a conveying path extending in the longitudinal direction,
a plurality of transverse members of the receivers or upper parts of the transverse members each comprising a support section extending in the transverse direction for support at the longitudinal members and a carrier section extending upwardly from the support section.

31. A conveying device in accordance with claim 30, further comprising a plurality of clamps which are each formed by transverse members of the receivers and which comprise a respective bracing device.

32. A conveying device comprising:
a base supported on the ground;
at least two longitudinal members which are carried by the base, which extend in a longitudinal direction and which are spaced apart from one another in a transverse direction; and
a plurality of receivers which are arranged behind one another in the longitudinal direction, the plurality of receivers carried by the longitudinal members and at which conveyor belt sections are supported, the conveyor belt sections individually attachable and removable and which together form a conveying path extending in the longitudinal direction,
wherein the receivers each comprise at least one holder which is held at one side and which freely projects toward the other side and via which a respective conveyor belt section is couplable to the receiver.

33. A conveying device in accordance with claim 32, further comprising a plurality of clamps which are each formed by transverse members of the receivers and which comprise a respective bracing device.

\* \* \* \* \*